(12) United States Patent
De Muijnck

(10) Patent No.: US 7,871,656 B2
(45) Date of Patent: Jan. 18, 2011

(54) LOW AND NO TRANS FAT CONFECTIONS

(75) Inventor: Leanne De Muijnck, Milwaukee, IL (US)

(73) Assignee: Archer Daniels Midland Company, Decatur, IL (US)

( * ) Notice: Subject to any disclaimer, the term of this patent is extended or adjusted under 35 U.S.C. 154(b) by 834 days.

(21) Appl. No.: 11/220,799

(22) Filed: Sep. 6, 2005

(65) Prior Publication Data

US 2006/0051488 A1 Mar. 9, 2006

Related U.S. Application Data

(60) Provisional application No. 60/607,773, filed on Sep. 7, 2004.

(51) Int. Cl.
*A23P 1/08* (2006.01)

(52) U.S. Cl. ...................................... 426/613; 426/606

(58) Field of Classification Search .................. 426/601, 426/607, 613
See application file for complete search history.

(56) References Cited

U.S. PATENT DOCUMENTS

| | | | | |
|---|---|---|---|---|
| 4,208,445 | A * | 6/1980 | Cottier et al. | 426/607 |
| 4,214,012 | A * | 7/1980 | Ainger et al. | 426/607 |
| 4,292,338 | A * | 9/1981 | Ainger et al. | 426/603 |
| 4,360,536 | A * | 11/1982 | Keuning et al. | 426/603 |
| 4,568,557 | A | 2/1986 | Becker et al. | |
| 4,673,578 | A | 6/1987 | Becker et al. | |
| 4,762,725 | A | 8/1988 | Player et al. | |
| 5,439,700 | A * | 8/1995 | Cain et al. | 426/607 |
| 5,532,021 | A * | 7/1996 | Kida et al. | 426/607 |
| 5,858,445 | A * | 1/1999 | Huizinga et al. | 426/607 |
| 6,156,370 | A * | 12/2000 | Huizinga et al. | 426/607 |
| 6,229,033 | B1 | 5/2001 | Knowlton | |
| 6,518,226 | B2 | 2/2003 | Volker et al. | |
| 6,562,394 | B1 | 5/2003 | Volker | |
| 6,808,737 | B2 * | 10/2004 | Ullanoormadam | 426/603 |
| 7,390,522 | B2 * | 6/2008 | Cain et al. | 426/607 |
| 2005/0163909 | A1 | 7/2005 | Cleenewerck et al. | |
| 2005/0276900 | A1 * | 12/2005 | Ullanoormadam | 426/601 |

FOREIGN PATENT DOCUMENTS

| | | |
|---|---|---|
| EP | 1 040 761 A | 10/2000 |
| EP | 1 159 877 A | 12/2001 |
| GB | 2281304 A | 1/1995 |
| WO | WO 95/06414 A | 3/1995 |

OTHER PUBLICATIONS

Aini et al. 1999. JAOCS 76(5) 643.*
Epstein, B. and Klein, H. 1996. Substituting Ingredients. The Globe Pequot Press, Guilford, CT, p. 15-16.*
Boucher, G., editor. 1981. Candy. Time-Life Book, Alexandria, VA, p. 100-101.*
Swern, D, editor. 1079, Bailey's Industrial Oil and Fat Products, vol. 1, $4^{th}$ edition. John Wiley & Sons, New York, p. 318-319. 377, 379.*
Written Opinion of the International Searching Authority for International Application No. PCT/US2005/031673, European Patent Office (acting as International Searching Authority), 5 pp. (Jan. 4, 2006).
International Search Report for International Application No. PCT/US2005/031673, European Patent Office (acting as International Searching Authority), 3 pp. (Jan. 4, 2006).
Tentative Product Specifications sheet for HUMKO® ZT Coating Fat, Product No.: Trial Product, Formula: TBD, AC HUMKO Sales Group, Effective: Apr. 15, 2005.
Gunstone et al., Modification Processes and Food Users, The Lipid Handbook, Third Edition, 2007, pp. 347, CRC Press Taylor & Francis Group New York.
AarhusUnited, Cebes 21-20, Data Sheet, Issue 5, Date Apr. 1, 1998, New Jersey, USA, www.aarhusunited.com/usa.
Palkena S, Data sheet, Technical Bulletin, Fuji Vegetable Oil, Inc., Nov. 3, 2003, No. 13284, White Plains, NY, USA.

* cited by examiner

*Primary Examiner*—Carolyn A Paden
(74) *Attorney, Agent, or Firm*—Andrew F. Nilles

(57) ABSTRACT

A fat composition for use in food products is provided, which contains low levels of trans fats, and includes a non-hydrogenated fractionated palm kernel oil and a non-hydrogenated fractionated palm oil. A confectionery composition containing the fat composition also is provided. The confectionery composition can be used to coat a food product, and can be flavored and/or colored. Methods for making a confectionery composition using the fat composition also are provided.

18 Claims, No Drawings

LOW AND NO TRANS FAT CONFECTIONS

CROSS-REFERENCE TO RELATED APPLICATIONS

This application claims the benefit of U.S. Provisional Patent Application Ser. No. 60/607,773, filed Sep. 7, 2004, which is incorporated by reference herein in its entirety.

FIELD OF THE INVENTION

The present invention is directed to low trans fat confections, such as chocolate-flavored confections, and related methods.

BACKGROUND

Confections are sweet foods. Confections, such as candies and cookies, may be eaten alone. Other confections, including candies, may be incorporated into other foodstuffs, which also typically are confections, as is the case with chocolate chips incorporated into chocolate-chip cookies or glazes or enrobing compositions for candies or baked goods. Chocolate products include a number of products, many of which have defined ingredients, and/or identity standards established by various national or international regulatory bodies. For example, milk chocolate, by definition, has specific ratios of cocoa liquor, cocoa butter, milk or cream and sugar. Other forms of chocolate, such as chocolate, baking chocolate or unsweetened chocolate (cocoa liquor), sweet chocolate, semisweet or bittersweet chocolate and white chocolate also have defined compositions. Many confections, such as chocolate enrobing compositions or glazes, chocolate sauces or chips vary from the definition of chocolate because they contain fats other than cocoa butter. For example, chocolate sauces typically are prepared from vegetable oils and cocoa powder. Dairy fats may also be included and are a natural source of trans fats, albeit in very low concentrations.

Chocolate flavored enrobing compositions, if not a standard-of-identity chocolate variety, typically include cocoa powder or chocolate liquor and a fat or fat blend. A fat or fat blend is selected having a melting profile and melting point well suited for the intended use. For example, if the product is intended for use in coating a baked product, the enrobing composition should have melting properties well suited to the temperatures the end-product is subjected to during handling, storage, transport and serving within its typical distribution/consumption chain. A typical enrobing composition also may be tailored to substantially melt near human body temperature (37° C.) in order to not be considered unappealing and produce a waxy feeling in the mouth. Higher melting temperatures may be desired when a food product is transported, stored or served under warmer conditions, such as transport and consumption in tropical or desert climates, or when used within military rations.

"Trans" fats are isomers of naturally occurring unsaturated fatty acids that may be created during the hydrogenation and partial hydrogenation processes. Recently, however, ingestion of trans fats has been discovered to increase serum cholesterol levels. However, trans fats have been used in processed foods for many years, and many food product formulations contain partially or fully hydrogenated fats. There is therefore a need for fat compositions that can be substituted into currently used food formulations, contain only low levels or are free from trans fats, and have acceptable functional properties including similar melting profile, crystallization characteristics, shelf-life, and mouth-feel. It is particularly desirable to provide to the food industry fat compositions which are sufficiently low in trans fats to allow food manufacturers to display or feature the low trans fat content of their products, such as by a label claim or on the nutritional composition panel.

SUMMARY OF THE INVENTION

A fat composition for use in food products is provided, which contains substantially no trans fats, and includes a non-hydrogenated fractionated palm kernel oil and a non-hydrogenated fractionated palm oil. Confectionery compositions also are provided, which contain the fat composition. The confectionery composition can be used to coat a food product. The confectionery compositions can be flavored, for instance, they can be chocolate flavored. The fat composition is a substitute for the hydrogenated and partially hydrogenated trans fat-containing fat or fat blends traditionally used in such products.

A fat composition having substantially no trans fats is provided, where the composition includes a non-hydrogenated fractionated palm kernel oil and a non-hydrogenated fractionated palm oil. Methods for making a confectionery composition containing substantially no trans fats also are provided. By "substantially no trans fats" is meant that the finished product contains less 5 grams of trans fat per serving, more preferably less than 2 grams of trans fat per serving, and most preferably less than 0.5 grams of trans fat per serving.

A confectionery composition is also provided which includes a fat composition comprising a non-hydrogenated fractionated palm kernel oil and a non-hydrogenated fractionated palm oil; a sweetening ingredient; an emulsifier; and flavoring.

Also provided is a method of making a confectionery composition low in trans fat, the method comprising: providing a fat composition comprising a non-hydrogenated fractionated palm kernel oil and a non-hydrogenated fractionated palm oil, a sweetening ingredient, an emulsifier, and flavoring; combining with the sweetening ingredient a sufficient amount of the fat composition so that when combined, a dough-like product is formed; optionally grinding the dough-like product of (b); combining the emulsifier and the flavoring and a sufficient amount of the fat composition so that when mixed, a flowable mass is formed; and optionally cooling the flowable mass of (d); thereby forming a confectionery composition.

Another method is provided for making a confectionery composition low in trans fat, the method comprising: providing a fat composition comprising a non-hydrogenated fractionated palm kernel oil and a non-hydrogenated fractionated palm oil, a sweetening ingredient, an emulsifier, and flavoring; combining the fat composition and the emulsifier with the sweetening ingredient to form a paste; combining the flavoring with the paste of (b); optionally refining the paste of (c); and optionally cooling the flowable confectionery mass of (d); thereby forming a confectionery composition.

DETAILED DESCRIPTION

A confectionery composition for coating food products is provided, as well as a fat composition for use in making the confectionery composition. The confectionery composition and the fat composition contain no trans fats, and include a non-hydrogenated fractionated palm kernel oil and a non-hydrogenated fractionated palm oil. The confectionery composition can be chocolate flavored, or can be sweet and containing flavorings other than chocolate. A chocolate coating for baked goods such as doughnuts, and a chocolate confectionery chip composition also are provided. The fat composition is a substitute for the fats traditionally used in such coatings, which usually include trans and partially hydrogenated fats.

The fat composition can be used in a confectionery coating for a food product. The confectionery coating is preferably chocolate-flavored, but also can be white chocolate flavored, or have other flavoring and related appropriate coloring added, such as, but not limited to, vanilla, butterscotch, cinnamon, strawberry, lemon, orange, banana, maple, yoghurt, carob, etc. The confectionery coating contains the fat composition as described herein, a sweetening ingredient, an emulsifier, and preferably a vanilla flavoring. The coating composition also can contain a chocolate flavoring ingredient, or other flavorings. In general, chocolate flavored food products contain some amount of vanilla or vanilla-like flavoring, while vanilla-flavored products contain more.

The terms "confectionery coatings," "confections," "chocolate confections," "chocolate-flavored confections," as used herein, include a variety of confections. Most contain the characteristic chocolate flavor, with the exception of "white" chocolate confections, which do not contain cocoa powder or liquor, but do contain cocoa butter, or a similar flavoring. The chocolate confections may contain chocolate, as it is specifically defined by codex or regulation, or chocolate flavorings, which include natural ingredients, such as cocoa powder, cocoa extract, cocoa butter, chocolate liquor, sugar, milk, or other ingredients of natural origin, or artificial ingredients, including artificial flavorings or sweeteners. The confections disclosed herein are intended to include white chocolate flavored confections and other colored, sweet, flavored confections.

Chocolate-flavored confections typically are prepared from products derived from cacao beans, including, without limitation, cocoa powder, cocoa butter and chocolate liquor. In a typical process for making chocolate, the cacao seeds are fermented or non-fermented and dried. The seeds are then cracked to remove the seed husks and to break the seeds into small pieces called nibs. Blowers typically are used to separate the seed husks from the nibs. The nibs are sterilized and roasted and then the roasted nibs are ground or milled to prepare a thick paste known as chocolate liquor or cocoa liquor. Cocoa liquor contains about half cocoa butter and half cocoa solids and is the principal constituent of unsweetened baking chocolate. Chocolate liquor can be pressed to separate the cocoa butter from the cocoa solids. White chocolate contains cocoa butter, but no cocoa powder or cocoa liquor.

The "chocolate flavoring ingredient" as it is used in the confectionery coating described herein, is used to impart a chocolate flavor to the coating, and is intended to include cocoa, cocoa powder, or chocolate liquor.

The term "sweetening ingredient" is intended to include substances which contribute a sweet taste to the finished product. Sweeteners can therefore include true sweeteners composed of simple carbohydrates (including, but not limited to, sucrose, fructose, glucose, lactose, maltose, dextrose), but also sugar alternatives such as "polyols" (including, but not limited to, sorbitol, mannitol, isomalt, maltitol, lactitol, and xylitol), sugar substitutes (including, but not limited to, sucralose, acesulfame K, aspartame, cyclamates, saccharin, thaumatin, neohesperidine DC), and other substances that impart a sweet taste.

"Emulsifier," as used herein, is intended to include the use of any emulsifier that can be used in meltable food coatings. Emulsifiers aid in mixing the fat phase with other ingredients. They aid in fat dispersion by breaking the fat into a large number of smaller particles. Emulsifiers include small molecule types (including, but not limited to, lecithins, monoglycerides, diglycerides, sucrose esters, sorbitan esters (SPAN), polysorbates (TWEEN), stearoyl lactylates, lecithin and its derivatives) and macromolecular types (including, but not limited to, proteins such as bovine serum albumin, b-lactoglobulin, lysozyme, and ovalbumin).

"Vanilla flavoring" is intended to include both the natural and synthetic forms of vanilla, vanillin, and mixtures thereof.

The present invention uses a fat composition that includes fractionated palm kernel oil (FPKO) and fractionated palm oil (FPO). The FPKO and FPO are combined, preferably in a ratio of FPKO to FPO of about 60-80 to about 20-40, more preferably a ratio of about 65-75 to about 25-35, and most preferably of about 69 to about 31. This ratio provides a fat composition with a solid fat content (SFC) profile, a solid fat index (SFI) profile, and a Mettler Drop Point (MDP) as provided in Table 3 below. The fat composition described herein was found to produce a confectionery coating with a viscosity and melting point similar to coatings made with currently-used trans fat compositions, which contain hydrogenated and/or partially hydrogenated fats.

A wider, but still preferable, ratio of FPKO to FPO 75:25, or 65:35 can also be used. Ratios of 60:40 and 50:50 can also be desirable for some purposes. FPKO to FPO ratios of 25:75 can also be used where a high Mettler Drop Point (MDP) is required. For other applications, ratios such as 90:10 and 80:20 would be more appropriate.

Palm Oils

Oil palm varieties typically yield two types of oil: palm oil and palm kernel oil. Palm oil is pressed from the flesh of the fruit, and palm kernel oil from the seed or kernel. The production of palm oil to palm kernel oil is about 10 to 1. Palm oil also contains tocopherols and tocotrienols (Vitamin E).

The palm oil and palm kernel oil can be fractionated using crystallization and separation processes to obtain more solid (stearin) fractions and more liquid (olein) fractions, which have different melting characteristics. Various grades of the stearin and olein fractions are produced commercially, and food manufacturers routinely select those grades having the properties required for the intended purpose.

The oils also can be hydrogenated and/or interesterified, although this is not always required. Palm oil has a long shelf life and good storage stability due to its relatively low levels of unsaturated fatty acids, and is relatively resistant to oxidative deterioration and rancidity. Because of its oxidative stability and availability, palm oil also is a preferred frying oil in some regions for some applications.

Palm oil is a natural source of Vitamin E, the tocopherols, and tocotrienols. These components are dietary essentials, whose main function is to act as anti-oxidants, substance that prevents oxidation. Unprocessed palm oil is used in a number of countries for cooking and also is a source of beta-carotene, an important source of Vitamin A.

Palm kernel oils impart a number of advantages to the confections described herein. The oils have a relatively stable beta prime crystalline form necessary for a fine structure, and palm kernel oil contains short and medium chain length glycerides similar to those found in butter fat. These properties provide excellent mouth-feel and melting characteristics.

Measurement of Softening Points

The softening point of a fat blend is a function of both its rheological properties and its crystalline melting point or glass transition temperature. The softening point of a fat blend can be measured in a variety of ways. A preferred method in the food industry is the Mettler Drop Point (MDP) test.

Mettler Drop Point (ASTM D-3954)

The Mettler Drop Point (MDP) test is generally used to test the softening point of fats or blends of fats. Naturally occurring fats and oils, and products derived from them, comprise a mix of several (up to 1200) molecular species. Each species has a discrete melting point, so the melting behavior of a fat or fat blend is determined by the composition. In addition, several different types of crystals can be formed in fat and fat blend; the different crystals have different packing and melting behaviors. Several different crystal types can be formed from the same blend of fat by subjecting the blend to different temperature regimes. Thus, the melting behavior of fats or fat blends is a consequence of the composition of the blend and the temperature history and a functional test like the Mettler drop test is most useful in food applications. A sample of the fat or fat blend is exposed to increasing temperature by means of increasingly hot air. As the temperature increases, the fat or fat blend deforms under its own weight and eventually flows downward. When the fat or fat blend has flowed downward 19 mm, it passes through a light beam and the temperature of the air is recorded. The MDP test also is described in the AOCS Official method CC 18-80.

Solid Fat Index (SFI) and Solid Fat Content (SFC)

As fat melts, the crystalline portions become liquefied, and are less efficiently arranged, and the fat expands in volume. Therefore, as a chilled product containing fat is warmed, the fat within it, and hence the product itself, expands in volume.

The Solid Fat Index (SFI) measures the expansion, and hence, the content of solid fat in the sample. It is generally measured by dilatometry, which are specialized Pyrex vessels with a bulb and a precision bore capillary tubing graduated in 0.005 milliliter increments from 0 to 1.400 milliliters. The instrument measures the change in volume as the temperature changes. Changes in volume are generally made at five different temperatures (50° F., 70° F., 80° F., 92° F., 100° F. and 104° F.) and the SFI is calculated from the dilatometer readings.

The Solid Fat Content (SFC) is the percent of fat that is solid at a given temperature. Measurement of the SFC over a range of temperatures is required to understand the properties of the fat across temperatures. SFC is measured by low resolution, pulsed nuclear magnetic resonance (NMR). The signal of the liquid fat in the sample is measured, and compared to the total liquid content obtained after melting the sample at 60° C.

The two values are related, and are important in determining the mouth-feel of a food product. The ratios of solid fat to liquid fat may be very important in some food applications, while not important in others. In confectionery products, the solid fat/liquid fat ratio is the main determinant of the product's body and mouth-feel.

EXAMPLES

Example 1

Formulation and Testing of Fat Blends and Base Fat Mix Coatings

Various fat blends were prepared and tested for their properties. First, several fat mixtures were made ("Mixture"; Table 1, below) and then tested for MDP, and also SFC and SFI at various temperatures. One hundred percent FPKO ("Palkena S") and 100% FPO ("Tem-Tex") also were tested as controls.

TABLE 1

Formulation and Testing of Various Fat Blends and Fat Mix Coatings

| Mixture | | 75/25 | 65/35 | 60/40 | 50/50 | Palkena S | Tem-Tex PST |
|---|---|---|---|---|---|---|---|
| Ingredients | FPKO (Palkena S) | 75%* | 65% | 60% | 50% | 100% | — |
| | FPO (Tem-Tex PST) | 25% | 35% | 40% | 50% | — | 100% |
| Results | Mettler Dropping Point (MDP) | 100.7 | 104.6 | 105.8 | 120 | 92 | 129 |
| | SFC 50° F. | 89.2 | 86.1 | 85.4 | 84.5 | 92.8 | 79 |
| | SFC 70° F. | 67.6 | 65.8 | 62.5 | 60.9 | 80.9 | 66.8 |
| | SFC 80° F. | 41.8 | 41.2 | 37.9 | 36.5 | 63.2 | 55.5 |
| | SFC 92° F. | 7.8 | 11.7 | 13.4 | 18.1 | 0.01 | 40.7 |
| | SFC 100° F. | 3 | 7 | 8.9 | 14.3 | 0 | 32.8 |
| | SFC 104° F. | 3 | 6.6 | 8.1 | 13.1 | 0 | 29.3 |
| | SFI 50° F. | 63.84 | 60.89 | 59.69 | 58.86 | 71.59 | 41.33 |
| | SFI 70° F. | 53.69 | 49.78 | 46.71 | 44.42 | 66.3 | 32.62 |
| | SFI 80° F. | 38.41 | 34.55 | 32.06 | 31.28 | 54.7 | 29.73 |
| | SFI 92° F. | 8.69 | 11.95 | 13.88 | 19.96 | 0.02 | 25.85 |
| | SFI 100° F. | 3.82 | 10.54 | 12.83 | 19.75 | 0 | 21.88 |
| | SFI 104° F. | 3.64 | 9.64 | 12.03 | 19.67 | 0 | 20.49 |

*All percentages are by weight.

These same fat blends were then tested as part of a base fat mix coating, that is, to the fat mixtures listed above, additional ingredients were added that would normally be part of a confectionery coating formulation. Formulations and testing results are provided in Table 2, below. The MDP, SFC and SFI values from Table 1 for the 100% FPKO and 100% FPO are included again in this table for reference.

TABLE 2

Formulation and Testing of Various Fat Mix Coatings

| Mixture | | 75/25 | 65/35 | 60/40 | 50/50 | Palkena S | Tem-Tex |
|---|---|---|---|---|---|---|---|
| Ingredients | FPKO (Palkena S) | 67.8%* | 58.8% | 54.2% | 45.2% | 100% | |
| | FPO (Tem-Tex) | 22.6% | 31.6% | 36.2% | 45.2% | | 100% |
| | Cocoa Butter | 5.1% | 5.1% | 5.1% | 5.1% | | |
| | Sorbitan monostearate | 1.8% | 1.8% | 1.8% | 1.8% | | |
| | Soy lecithin (ADM Yelkin SS) | 1.5% | 1.5% | 1.5% | 1.5% | | |
| | Polysorbate 60 | 1.1% | 1.1% | 1.1% | 1.1% | | |
| | total | 100.0% | 100.0% | 100.0% | 100.0% | | |
| Results | MDP | 99.9 | 103.9 | 105.6 | 108.4 | 92 | 129 |
| | SFC 50° F. | 87.5 | 85.4 | 84.5 | 84.2 | 92.8 | 79 |
| | SFC 70° F. | 66.8 | 62.2 | 60.8 | 58.7 | 80.9 | 66.8 |
| | SFC 80° F. | 42.2 | 38.8 | 37.5 | 38 | 63.2 | 55.5 |
| | SFC 92° F. | 9.3 | 12.5 | 14.5 | 18.7 | 0.01 | 40.7 |
| | SFC 100° F. | 4.4 | 7.7 | 9.8 | 13.1 | 0 | 32.8 |
| | SFC 104° F. | 4.2 | 7 | 9 | 11.7 | 0 | 29.3 |
| | SFI 50° F. | 61.89 | 59.24 | 57.8 | 48.39 | 71.59 | 41.33 |
| | SFI 70° F. | 49.76 | 45.33 | 42.83 | 33.08 | 66.3 | 32.62 |
| | SFI 80° F. | 35.23 | 31.59 | 31.05 | 25.05 | 54.7 | 29.73 |
| | SFI 92° F. | 9.29 | 12.95 | 14.62 | 15.14 | 0.02 | 25.85 |
| | SFI 100° F. | 3.36 | 9.06 | 11.88 | 12.18 | 0 | 21.88 |
| | SFI 104° F. | 2.59 | 8.82 | 10.69 | 6.95 | 0 | 20.49 |

*All percentages are by weight.

Example 2

Comparison of Blends Made From Fats From Different Suppliers

Because a melting temperature of 100-102° F. is considered ideal for a confectionery coating for baked goods such as doughnuts, the ratio of FPKO:FPO of 69:31 was chosen for further testing. This ratio was used in testing FPKO from two different suppliers for SFC, SFI, MDP and cis and trans fatty acid content. The FPKO was either CEBES® 21-20 (Aarhus United USA, Inc., Port Newark, N.J., USA) or Palkena-S (Fuji Vegetable Oil, Inc., Savannah, Ga., USA). The FPO was Tem-Tex PST (ACH Food Companies, Inc., Memphis, Tenn., USA).

The results are provided in Table 3, below.

TABLE 3

SFC, SFI, MDP and Fatty Acid Profiles for Fat Mixes From Different Suppliers

| | 69% CEBES 21-20: 31% TEM-TEX PST | 69% PALKENA S: 31% TEM-TEX PST |
|---|---|---|
| SFC @ 50° F. | 87.5 | 86.8 |
| SFC @ 70° F. | 63.7 | 64.8 |
| SFC @ 80° F. | 35.6 | 38.1 |
| SFC @ 92° F. | 9.3 | 9.6 |
| SFC @ 100° F. | 6.2 | 6.7 |
| SFC @ 104° F. | 5.6 | 5.9 |
| SFI @ 50° F. | 57.81 | 60.12 |
| SFI @ 70° F. | 45.79 | 48.61 |
| SFI @ 80° F. | 30.29 | 33.62 |
| SFI @ 92° F. | 9.4 | 10.07 |
| SFI @ 100° F. | 8.89 | 9.93 |
| SFI @ 104° F. | 8.59 | 9.59 |
| MDP | 105.6 | 104.7 |

TABLE 3-continued

SFC, SFI, MDP and Fatty Acid Profiles for Fat Mixes From Different Suppliers

| | 69% CEBES 21-20: 31% TEM-TEX PST | 69% PALKENA S: 31% TEM-TEX PST |
|---|---|---|
| Total trans fatty acids | 0.57 | 0.56 |
| Total C18:1 trans fatty acids | 0.45 | 0.44 |
| Total C18:1 cis fatty acids | 12.65 | 12.86 |
| Total C18:2 trans fatty acids | 0.11 | 0.11 |
| Total C18:2 cis fatty acids | 2.47 | 2.46 |
| Total C18:3 trans fatty acids | 0.01 | 0.01 |
| Total C18:3 cis fatty acids | 0.04 | 0.04 |
| Total saturated fatty acids | 84.14 | 83.96 |
| Total C18:0 fatty acids | 3.59 | 3.56 |
| Total C16:0 fatty acids | 24.25 | 24.37 |

Example 3

Fatty Acid Profiles for Various Fat Blends and Fat Mix Coatings

The fat blends from Table 1, above, were analyzed for their fatty acid profiles. One hundred percent FPKO ("Palkena S") and 100% FPO ("Tem-Tex") also were tested as controls.

TABLE 4

Fatty Acid Profiles for Various Fat Blends

| Fat Blend (FPKO/FPO) | 75/25 | 65/35 | 60/40 | 50/50 | 100/0 | 0/100 |
|---|---|---|---|---|---|---|
| Caproic C6:0 | 0.09* | 0.08 | 0.07 | | 0.11 | |
| Caprylic C8:0 | 1.44 | 1.31 | 1.17 | 1.01 | 2.01 | |
| Capric C10:0 | 2.09 | 1.85 | 1.69 | 1.42 | 2.88 | |

TABLE 4-continued

Fatty Acid Profiles for Various Fat Blends

| Fat Blend (FPKO/FPO) | 75/25 | 65/35 | 60/40 | 50/50 | 100/0 | 0/100 |
|---|---|---|---|---|---|---|
| Lauric C12:0 | 40.66 | 35.40 | 32.30 | 26.98 | 54.79 | 0.26 |
| Myristic C14:0 | 16.33 | 14.31 | 13.18 | 11.18 | 21.58 | 1.37 |
| Myristoleic C14:1 | | | | | | 0.07 |
| Palmitic C16:0 | 21.75 | 26.61 | 29.27 | 34.09 | 8.73 | 58.73 |
| Palmitoleic C16:1 | | | | | | 0.11 |
| Heptadecanoic C17:0 | | 0.07 | 0.07 | 0.09 | | 0.14 |
| Stearic C18:0 | 3.98 | 4.27 | 4.39 | 4.61 | 2.87 | 6.28 |
| Elaidic C18:1 n9trans | 0.27 | 0.13 | 0.15 | 1.23 | | 0.25 |
| Oleic C18:1 n9cis | 10.85 | 12.69 | 13.94 | 14.99 | 6.00 | 25.22 |
| C18:2 9c12trans | | | | | | 0.08 |
| C18:2 12c9trans | | | | | | 0.09 |
| Linoleic C18:2 cc | 2.14 | 2.58 | 2.92 | 2.99 | 0.91 | 5.65 |
| Arachidic C20:0 | 0.16 | 0.18 | 0.21 | 0.23 | 0.11 | 0.38 |
| Eicosenoic C20:1c | | 0.07 | 0.07 | | | 0.11 |
| Linolenic C18:3 n3cis | | | | | | 0.11 |
| Behenic C22:0 | | | | | | 0.06 |
| Lignoceric C24:0 | | | | | | 0.07 |
| Total Trans FAs | 0.27 | 0.34 | 0.40 | 1.64 | 0.00 | 0.90 |
| Total C18:1 trans FAs | 0.27 | 0.27 | 0.33 | 1.64 | 0.00 | 0.63 |
| Total C18:1 cis FAs | 11.09 | 12.99 | 14.32 | 15.76 | 6.00 | 25.88 |
| Total C18:2 trans FAs | 0.00 | 0.00 | 0.00 | 0.00 | 0.00 | 0.16 |
| Total C18:2 cis FAs | 2.14 | 2.58 | 2.92 | 2.99 | 0.91 | 5.65 |
| Total C18:3 trans FAs | 0.00 | 0.07 | 0.07 | 0.00 | 0.00 | 0.11 |
| Total C18:3 cis FAs | 0.00 | 0.00 | 0.00 | 0.00 | 0.00 | 0.11 |
| Total saturated FAs | 86.50 | 84.08 | 82.35 | 79.61 | 93.08 | 67.28 |
| Total C16:0 FA | 21.75 | 26.61 | 29.27 | 34.09 | 8.73 | 58.73 |
| Total C18:0 FA | 3.98 | 4.27 | 4.39 | 4.61 | 2.87 | 6.28 |

*Results are provided in Area Percent.

The fat mix coatings from Table 2 were tested for their fatty acid profiles. The results are provided in Table 5, below. The values from Table 4 for the 100% FPKO and 100% FPO are included again in this table for reference.

TABLE 5

Fatty Acid Profiles for Various Fat Mix Coatings

| Fat Mix Coating (FPKO/FPO) | 75/25 | 65/35 | 60/40 | 50/50 | 100/0 | 0/100 |
|---|---|---|---|---|---|---|
| Caproic C6:0 | 0.09* | | 0.07 | | 0.11 | |
| Caprylic C8:0 | 1.29 | 1.18 | 1.00 | 0.92 | 2.01 | |
| Capric C10:0 | 1.89 | 1.64 | 1.43 | 1.28 | 2.88 | |
| Lauric C12:0 | 36.93 | 31.67 | 28.35 | 24.10 | 54.79 | 0.26 |
| Myristic C14:0 | 15.04 | 12.96 | 11.84 | 10.13 | 21.58 | 1.37 |
| Myristoleic C14:1 | | | | | | 0.07 |
| Palmitic C16:0 | 22.48 | 27.30 | 30.16 | 34.22 | 8.73 | 58.73 |
| Palmitoleic C16:1 | | | 0.07 | 0.08 | | 0.11 |
| Heptadecanoic C17:0 | 0.08 | 0.07 | 0.09 | 0.10 | | 0.14 |
| Stearic C18:0 | 6.47 | 6.80 | 7.17 | 7.34 | 2.87 | 6.28 |
| Elaidic C18:1 n9t | 0.81 | 0.63 | 0.47 | 0.61 | | 0.25 |
| Oleic C18:1 n9c | 11.38 | 13.64 | 14.87 | 16.32 | 6.00 | 25.22 |
| C18:2 9c12t | | | | | | 0.08 |
| C18:2 12c9t | | | | | | 0.09 |
| Linoleic C18:2 cc | 2.44 | 3.07 | 3.40 | 3.69 | 0.91 | 5.65 |
| Arachidic C20:0 | 0.22 | 0.24 | 0.27 | 0.28 | 0.11 | 0.38 |
| Eicosenoic C20:1 c | | | 0.07 | 0.08 | | 0.11 |
| Linolenic C18:3 n3c | 0.11 | 0.13 | 0.12 | 0.14 | | 0.11 |
| Behenic C22:0 | | | | | | 0.06 |
| Lignoceric C24:0 | | | | | | 0.07 |
| Total Trans FAs | 1.07 | 0.81 | 0.66 | 0.86 | 0.00 | 0.90 |
| Total C18:1 trans FAs | 1.07 | 0.81 | 0.59 | 0.78 | 0.00 | 0.63 |
| Total C18:1 cis FAs | 11.89 | 14.13 | 15.31 | 16.86 | 6.00 | 25.88 |
| Total C18:2 trans FAs | 0.00 | 0.00 | 0.00 | 0.00 | 0.00 | 0.16 |
| Total C18:2 cis FAs | 2.44 | 3.07 | 3.40 | 3.69 | 0.91 | 5.65 |
| Total C18:3 trans FAs | 0.00 | 0.00 | 0.07 | 0.08 | 0.00 | 0.11 |
| Total C18:3 cis FAs | 0.11 | 0.13 | 0.12 | 0.14 | 0.00 | 0.11 |
| Total Saturated FAs | 84.48 | 81.85 | 80.44 | 78.38 | 93.08 | 67.28 |
| Total C16:0 FA | 22.48 | 27.30 | 30.16 | 34.22 | 8.73 | 58.73 |
| Total C18:0 FA | 6.47 | 6.80 | 7.17 | 7.34 | 2.87 | 6.28 |

*Results are provided in Area Percent.

Example 4

Wet Grind Method of Making a Confection

There are several ways to produce confectionery products on an industrial scale, and such methods are known to those of ordinary skill in the confectionery and food processing field. Two common methods are the wet grind method and the dry grind method.

In the wet grind method, the dry ingredients are mixed, and enough of the fat is added to form a dough-like product, for instance, with a Buhler Kneader Mixer, Paste Mixer, or the like.

In order to reduce the particle size, this dough-like product is ground with either a one-stage or a two-stage roller refining process. An example of an appropriate refiner is a Buhler 2 roll and/or 5 roll refiner. The refining settings are adjusted to meet the required particle size character of the end product.

The resulting powdery product is mixed with the remaining fat and the lecithin to form a flowable mass. Mixing can be done with, for instance, a paddle mixer.

In the case of a doughnut coating, for example, the product may be shipped in liquid form, or it can be deposited in wafers or molded into blocks, e.g., 10-lb. blocks. If formed into wafers or blocks, the product is cooled down close to its melting point, deposited on a belt or poured into a mold. The product is then cooled, such as by passage through a cooling tunnel, and packaged, typically in 50-lb. cases.

In the case of confectionery drops, the paste is cooled down close to its melting point, and deposited in a chip form on a belt. The product is then cooled, such as by passage through a cooling tunnel, and packaged, typically in 50-lb. cases.

Example 5

Dry Grind Method of Making a Confection

In the dry grind method, all solid ingredients are mixed and refined with a dry grind system, such as, for instance, a micropulse ACM 60 Mill or a Bauermeister GAP mill.

After refining, fat and lecithin is added to the dry product and mixed to form a paste.

For a cinnamon flavored product, cinnamon and oil may be ground separately in a ball mill. This slurry is then combined with the other dry ground ingredients and the remaining fat, and are mixed and further refined with a MacIntyre refiner conche.

In the case of a doughnut coating, the product may be shipped in liquid form, or it can be deposited in wafers or molded into blocks, e.g., 10-lb. blocks. If formed into wafers or blocks, the product is cooled down close to its melting point, deposited on a belt or poured into a mold. The product is then cooled, such as by passage through a cooling tunnel, and packaged, typically in 50-lb. cases.

In the case of confectionery drops, the paste is cooled down close to its melting point, and deposited in a chip form on a belt. The product is then cooled, such as by passage through a cooling tunnel, and packaged, typically in 50-lb. cases.

Example 6

Chocolate Doughnut Coating Formulation

Two doughnut coating formulations, S-2288 and S-2478, were prepared according to the wet method described in Example 4, above. The coating formulations are provided below in Table 6, and the specifications of the resulting products are provided in Table 7, below.

By "typical ranges" is meant that these types of ingredients (e.g., sugar, cocoa powder, fat, etc.) are used in amounts in these ranges in typical coating formulations.

TABLE 6

Two Doughnut Coating Formulations

| Ingredient (%) | S-2288 (%) | S-2478 (%) | Typical ranges (%) |
|---|---|---|---|
| Sugar | 52.62 | 52.62 | 45-55 |
| Fractionated Palm kernel oil * | 20.70 | — | 10-30 |
| Fractionated Palm oil ** | 9.30 | — | 0-20 |
| Mix fractionated palm oil and fractionated palm kernel oil *** | — | 29.78 **** | 25-35 ***** |
| Natural cocoa powder | 11.80 | 11.80 | 6-16 |
| Black alkalized cocoa powder | 4.00 | 4.00 | 0-8 |
| Monoglyceride (ADM DMG-03) | | 1.00 | 0-2 |
| Soy lecithin (ADM Yelkin SS) | 0.50 | 0.50 | 0-1 |
| Polysorbate 60 | 0.38 | 0.20 | 0-1 |
| Sorbitan monostearate | 0.60 | — | 0-2 |
| Salt | 0.07 | 0.07 | 0-0.2 |
| Methyl vanillin | 0.03 | 0.03 | 0-0.1 |
| Total | 100.00 | 70.22 | |

* Fractionated palm kernel oil such as, e.g., Palkena S No. 13254, Fuji Vegetable Oils or equivalent.
** Fractionated palm oil such as e.g., Tem-Tex PST No 18285, ACH Food Companies or equivalent.
*** Mix of FPKO and FPO, such as e.g., Palkena/Palm Stearine PF # 7, Fuji Vegetable Oils or equivalent.
**** This combined fat composition replaces the two individual components of fractionated palm oil (FPO) and fractionated palm kernel oil (FPKO) in a ratio 31:69.
***** This is the range of fats and oils (non-palm) that are generally used in this type of product.

TABLE 7

Specifications of the Two Doughnut Coating Formulations

| Characteristic | S-2288 (%) | S-2478 (%) | Typical ranges (%) |
|---|---|---|---|
| Viscosity* | 11.30 | 10.04 | 10-20 |
| Fat (%) | 34.53 | 33.17 | 32.0-35.0 |
| Fineness (') | 0.0010 | | 0.0008-0.0012 |
| Hunter color D-25: L-value | 14.30 | 16.50 | 12.0-17.0 |
| Hunter color D-25: a-value | 4.60 | 4.40 | 2-6 |
| Hunter color D-25: b-value | 5.30 | 5.80 | 3-7 |
| Melt point extracted fat (° F.) | 100-102 | 100-102 | 97-110 |

*Viscosity measured in % Brookfield, at 20 RPM with spindle # 27, 50° F.

Both the S-2288 and the S-2478 formulations performed very well and produced a doughnut coating with the desired characteristics of appropriate mouth-feel and melting point. In the S-2478 formulation, monoglyceride was added for increased gloss, and the amounts of polysorbate and sorbitan monostearate were adjusted accordingly.

Example 7

Formulations for Confectionery Chips

Confectionery chips can be made in the same was as described above in Example 5, using the formulations and ingredients ranges provided below. A formulation for cinnamon-flavored chips is provided, along with ingredients ranges for cinnamon flavored chips. Ingredients ranges are also provided for chocolate flavored chips, and confectionery chips. Flavored confectionery chips can be made by using the ingredients ranges provided below and adding the appropriate flavorings, such as, but not limited to, vanilla, butterscotch, cinnamon, strawberry, lemon, orange, banana, maple, etc.

TABLE 8

Three Formulations for Confectionery Chips

| Ingredient | HC-2472 Cinnamon Chips | Ingredient Ranges for Cinnamon Chips | Confectionery Flavored Chips | Chocolate Flavored Chips |
|---|---|---|---|---|
| Sugar | 64.25 | 60-68 | 60-68 | 50 |
| FPKO* | — | — | | |
| FPO** | 1.80 | 0-6 | 0-6 | 0-6 |
| Fat Mix (FPKO:FPO 69:31)*** | 24.97 | 21-27 | 21-27 | 21-27 |
| Cinnamon | 7.75 | 1-10 | 0 | 0 |
| Non-fat Dry Milk | 1.00 | 0-5 | 0-10 | 0-10 |
| Soy lecithin (ADM Yelkin SS) | 0.23 | 0.1-0.5 | 0.1-0.5 | 0.1-0.5 |
| Flavoring | | | 1% max | 1% max |
| Cocoa | | | | 1-20 |
| Cocoa processed with alkali | | | | 1-20 |

All ingredients are listed in percentages by weight of the total ingredients.
*Fractionated palm kernel oil such as, e.g., Palkena S No. 13254, Fuji Vegetable Oils or equivalent.
**Fractionated palm oil such as e.g., Tem-Tex PST No 18285, ACH Food Companies or equivalent.
***Mix of FPKO and FPO, such as e.g., Palkena/Palm Stearine PF # 7, Fuji Vegetable Oils or equivalent.

TABLE 9

Specifications of the Chip Formulations

| Characteristic | HC-2472 Cinnamon Chips | Ingredient Ranges for Cinnamon Chips | Confectionery Flavored Chips | Chocolate Flavored Chips |
|---|---|---|---|---|
| Viscosity* | 28.0-35.0 | 28.0-35.0 | 28.0-35.0 | 28.0-35.0 |
| Fat (%) | 27.0 max | 29.0 max | 29.0 max | 29.0 max |
| Fineness (') | 0.0014-0.0016 | 0.0008-0.0018 | 0.0008-0.0018 | 0.0008-0.0018 |
| Hunter color D-25 L-value | 31-37 | 31-37 | 70-90 | 15-35 |
| Hunter color D-25 a-value | 7-12 | 7-12 | | |
| Hunter color D-25 b-value | 13-19 | 13-19 | | |
| Melt point extracted fat (° F.) | 102-106 | 98-110 | 98-110 | 98-110 |

*Viscosity measured in % Brookfield, at 20 RPM with spindle # 27, 50° F.

While this invention has been particularly shown and described with references to preferred embodiments thereof, it will be understood by those skilled in the art that various changes in form and details may be made therein without departing from the scope of the invention encompassed by the appended claims.

What is claimed is:

1. A confectionery coating composition low in trans fat, comprising:
   a fat composition comprising 50-75% of a non-hydrogenated, non-interesterified fractionated palm kernel oil and 25-50% of a non-hydrogenated fractionated palm oil, the fat composition having a content of C8-C14 saturated fatty acids of 40.59-60.52%;
   a sweetening ingredient;
   an emulsifier; and
   a flavoring;

wherein when the confectionery coating composition is subjected to a temperature above 110° F., the confectionery coating composition melts.

2. The confectionery coating composition of claim 1, where the fat composition contains 65% to 75% of the non-hydrogenated, non-interesterified fractionated palm kernel oil, and 25% to 35% of the non-hydrogenated fractionated palm oil.

3. The confectionery coating composition of claim 1, where the fat composition contains 55% to 65% of the non-hydrogenated, non-interesterified fractionated palm kernel oil, and 35% to 45% of the non-hydrogenated fractionated palm oil.

4. The confectionery coating composition of claim 1, where a ratio of the fractionated palm kernel oil to the fractionated palm oil is 69:31.

5. The confectionery coating composition of claim 1, where the flavoring is selected from the group consisting of: chocolate, white chocolate, vanilla, butterscotch, cinnamon, strawberry, lemon, orange, banana, maple, yoghurt and carob.

6. The confectionery coating composition of claim 1, where the flavoring is a chocolate flavoring ingredient.

7. The confectionery coating composition of claim 1, where the confectionery composition is a coating on a food product.

8. The confectionery coating composition of claim 7, where the food product is a baked product.

9. The confectionery coating composition of claim 7, where the food product is a doughnut.

10. The confectionery coating composition of claim 1, having a melting point of 97-110° F.

11. The confectionery coating composition of claim 1, wherein the flavoring comprises cocoa powder, cocoa butter or a combination thereof.

12. The confectionery coating composition of claim 1, wherein the confectionery coating composition comprises 45-55% by weight of the sweetening ingredient.

13. The confectionery coating composition of claim 1, wherein the flavoring is cocoa powder.

14. A confectionery coating composition low in trans fat, comprising:
 a fat composition comprising 50-75% of a non-hydrogenated fractionated palm kernel oil and 25-50% of a non-hydrogenated, non-interesterified fractionated palm oil, the fat composition having a content of C8-C14 saturated fatty acids of 40.59-60.52%;
 a sweetening ingredient;
 an emulsifier; and
 a flavoring;
 wherein when the confectionery coating composition is subjected to a temperature above 110° F., the confectionery coating composition melts.

15. A confectionery coating composition low in trans fat, comprising:
 a fat composition comprising a non-hydrogenated, non-interesterified fractionated palm kernel oil and a non-hydrogenated fractionated palm oil, the fat composition having an oleic acid content of at least 10.85%;
 a sweetening ingredient;
 an emulsifier; and
 a flavoring;
 wherein when the confectionery coating composition is subjected to a temperature above 110° F., the confectionery coating composition melts.

16. The confectionery coating composition of claim 15, wherein the non-hydrogenated fractionated palm oil is present at 10-75%.

17. The confectionery coating composition of claim 15, wherein a content of C8-C14 saturated fatty acids is between 40.59-81.26%.

18. The confectionery coating composition of claim 15, wherein a content of C8-C14 saturated fatty acids is between 40.59-60.52%.

* * * * *